(12) United States Patent
Crescenzo

(10) Patent No.: US 10,954,078 B2
(45) Date of Patent: Mar. 23, 2021

(54) METHOD AND APPARATUS FOR RECOGNIZING FRUIT ORIENTATION

(71) Applicant: Biagio Crescenzo, Montecorvino Pugliano (IT)

(72) Inventor: Biagio Crescenzo, Montecorvino Pugliano (IT)

(*) Notice: Subject to any disclaimer, the term of this patent is extended or adjusted under 35 U.S.C. 154(b) by 0 days.

(21) Appl. No.: 16/623,445

(22) PCT Filed: Jun. 1, 2018

(86) PCT No.: PCT/IB2018/053953
§ 371 (c)(1),
(2) Date: Dec. 17, 2019

(87) PCT Pub. No.: WO2018/234908
PCT Pub. Date: Dec. 27, 2018

(65) Prior Publication Data
US 2020/0207549 A1    Jul. 2, 2020

(30) Foreign Application Priority Data

Jun. 19, 2017 (IT) .................. 102017000068033

(51) Int. Cl.
*B65G 47/256* (2006.01)
*A23N 3/04* (2006.01)
*B65G 47/90* (2006.01)

(52) U.S. Cl.
CPC ............ *B65G 47/256* (2013.01); *A23N 3/04* (2013.01); *B65G 47/901* (2013.01);
(Continued)

(58) Field of Classification Search
CPC ...... A23N 3/04; B65G 47/256; B65G 47/901; B65G 47/905; B65G 47/907;
(Continued)

(56) References Cited

U.S. PATENT DOCUMENTS

| 4,586,613 | A | * | 5/1986 | Horii | ......................... B07C 5/36 |
| | | | | | 198/370.04 |
| 5,737,901 | A | * | 4/1998 | De Greef | ............... B25J 9/1697 |
| | | | | | 53/446 |

(Continued)

FOREIGN PATENT DOCUMENTS

| EP | 2167408 B1 | 11/2012 |
| EP | 2731893 A | 5/2014 |

(Continued)

*Primary Examiner* — Gene O Crawford
*Assistant Examiner* — Keith R Campbell
(74) *Attorney, Agent, or Firm* — Browdy and Neimark, PLLC

(57) ABSTRACT

A process for recognizing the orientation of a fruit, having a central axis of symmetry passing through the concave parts of the fruit. The process includes an initial measurement step in which the measuring instrument measures its distance from the sample fruit, an individual measurement step of each fruit to be treated travelling on the fruit multiple lanes tape, a comparison step in which the distance measured in the individual measurement step of each fruit to be treated is compared with the distances measured in the initial measurement step of the sample fruit to assess whether the distance measured in the individual measurement step is that one of a concave part of the fruit or that one of a convex part of the fruit, and a check step that determines that the fruit is correctly oriented or not. An apparatus that embodies this method is also described.

9 Claims, 5 Drawing Sheets

(52) U.S. Cl.
CPC ......... *B65G 47/905* (2013.01); *B65G 47/907* (2013.01); *B65G 2201/0211* (2013.01); *B65G 2203/044* (2013.01); *B65G 2207/42* (2013.01)

(58) Field of Classification Search
CPC ...... B65G 2201/0211; B65G 2203/044; B65G 2207/42; B65B 23/00; B65B 35/58
See application file for complete search history.

(56) References Cited

U.S. PATENT DOCUMENTS

| | | | | |
|---|---|---|---|---|
| 6,005,959 | A * | 12/1999 | Mohan | G01B 11/024 |
| | | | | 348/89 |
| 8,973,732 | B2 * | 3/2015 | Crescenzo | B65G 17/12 |
| | | | | 198/384 |
| 10,368,571 | B2 * | 8/2019 | Crescenzo | A23N 4/04 |
| 2015/0259088 | A1 * | 9/2015 | Liedl | B65B 35/58 |
| | | | | 700/213 |
| 2016/0300187 | A1 | 10/2016 | Kashi et al. | |

FOREIGN PATENT DOCUMENTS

| | | | | |
|---|---|---|---|---|
| JP | H11169799 | A | 6/1999 | |
| WO | WO-2015136420 | A1 * | 9/2015 | ............... A23N 3/04 |

* cited by examiner

METHOD AND APPARATUS FOR RECOGNIZING FRUIT ORIENTATION

TECHNICAL FIELD

The present invention relates to a method for recognizing the orientation of a fruit. Furthermore, it concerns an apparatus that embodies this method.

BACKGROUND ART

EP 2 731 893 describes a multiple-lane fruit positioning apparatus, in particular peaches, comprising a longitudinal frame and a fruit flight conveyor travelling in the longitudinal direction of said longitudinal frame. The fruit holding flights are shaped with a number of crosswise spaced recesses, each recess being inferiorly provided with an opening through which a part of the fruit protrudes. Located under the fruit holding is a fruit-orientating device including a plurality of longitudinally spaced transverse spindles, each bearing a number of transversely spaced orientating elements like said number of recesses. Each orientating element, being integrally rotatable with each transverse shaft which carries it, is in said recess opening in contact with the fruit contained therein and moves the fruit until a plane containing the suture line of each fruit is positioned at right angles with the longitudinal direction, and the stalk cavity thereof faces downwardly.

A drawback related to an automatic orientation operation such as that obtained in the apparatus of the aforementioned patent application lies in the fact that said automatic orientation operation does not absolutely guarantee that the central axis of symmetry of the fruit is positioned, after the automatic orientation operation, in a vertical position. This is due to the fact that the stalk cavity, for example that of peaches, or even the calycin, i.e. the apple cavity opposite to the stalk cavity, is not always so well defined to be perfectly combined with the orienting element. Ultimately, fruits are positioned blindly. As a result, not all the fruits reach the above mentioned position in the cutting station, with the consequence that not all the cuts are perfect, i.e. along the desired cutting surface.

WO-2015136420 provides a machine for recognizing and orienting fruits, especially peaches, comprising a fruit recognizing station suitable to detect the position of the vertical suture plane of each fruit, to calculate the dihedral angle formed between the vertical suture plane and the vertical cutting plane, and to communicate either information on the calculated dihedral angle or information of not detection. Further, the machine comprises an orientation station, being connected to a removing station. Thanks to the machine according to WO-2015136420 a cutting station is allowed to cut the fruits along their suture plane.

There are other operations such as fruit coring, in which it is not necessary for a fruit to be positioned with a precise arrangement of its suture plan. In fact, the coring generally involves the sinking of at least one knife in the direction of the axis of the fruit, as for peaches, or that passing through the calycin and the stalk cavity, as for apples, because it must take place in the axial direction of the hazel or core. To proceed with this operation, it is sufficient that the axis of the fruit is arranged vertically.

In this regard, EP 2 167 408 teaches how determine the orientation of the stalk-calycin axis with respect to supporting rollers of a fruit, in particular apples, by means of laser light illumination. In fact, a vision system is provided that is capable of acquiring and analyzing images of a fruit to establish when its stalk-calycin axis is placed in a vertical position. The procedure is quite complex because the images of the moving fruit are captured by a camera mounted above the rotating apple and processed to evaluate its position. It should be emphasized that the laser light in EP 2 167 408 only serves to illuminate the fruit because the function of automatic determination of the orientation of its axis is assigned to the cameras and to the image processing procedure.

There are documents in which a laser light is used as a distance meter in relation to a fruit. For example, JP H11169799 A describes an automatic sorting machine for fruit and vegetables in which a laser-type distance sensor is provided that detects the height of the fruit or vegetable to be conveyed by means of a conveyor, after being sorted. The sensor emits and receives a laser beam swung vertically downwards. In this way, the container in which to convey fruit or vegetables of different height can be chosen.

A similar distance meter is used for measuring box sizes and for optimal placement of objects in devices described by US 2016/0300187 A1.

SUMMARY OF INVENTION

An object of the present invention is to evaluate whether a fruit which travels on a recess of a fruit holding flight is disposed with the stalk cavity or the calycin facing downwards, and the central axis of symmetry of the fruit is supposed to be vertically arranged.

Another object of the present invention is to remove the not correctly oriented fruits from the processing line, i.e. those which are not arranged with the central axis of symmetry in a vertical position on the fruit holding flights.

In a first aspect of the invention, there is provided a method for recognizing the orientation of a fruit having a central axis of symmetry passing through the stalk cavity and the calycin and travelling on a fruit holding tape, comprising a check step that determines that the fruit is correctly oriented or not with its central axis of symmetry being in vertical position, in which the distance of the fruit is measured as greater than the distance of any part of the fruit different from the stalk cavity or from the calycin, or equal to this, so that to assess if the orientation of the central axis of symmetry of the fruit is vertical or not.

In a second aspect of the invention there is provided an apparatus for processing correctly oriented fruits which embodies this method.

BRIEF DESCRIPTION OF DRAWINGS

Further features and advantages of the present invention will become most clear from the indicative, and therefore not limiting, description of some embodiments of an apparatus for processing correctly oriented fruits, as illustrated in the accompanying drawings in which.

DESCRIPTION OF EMBODIMENTS OF THE INVENTION

Figure 1:
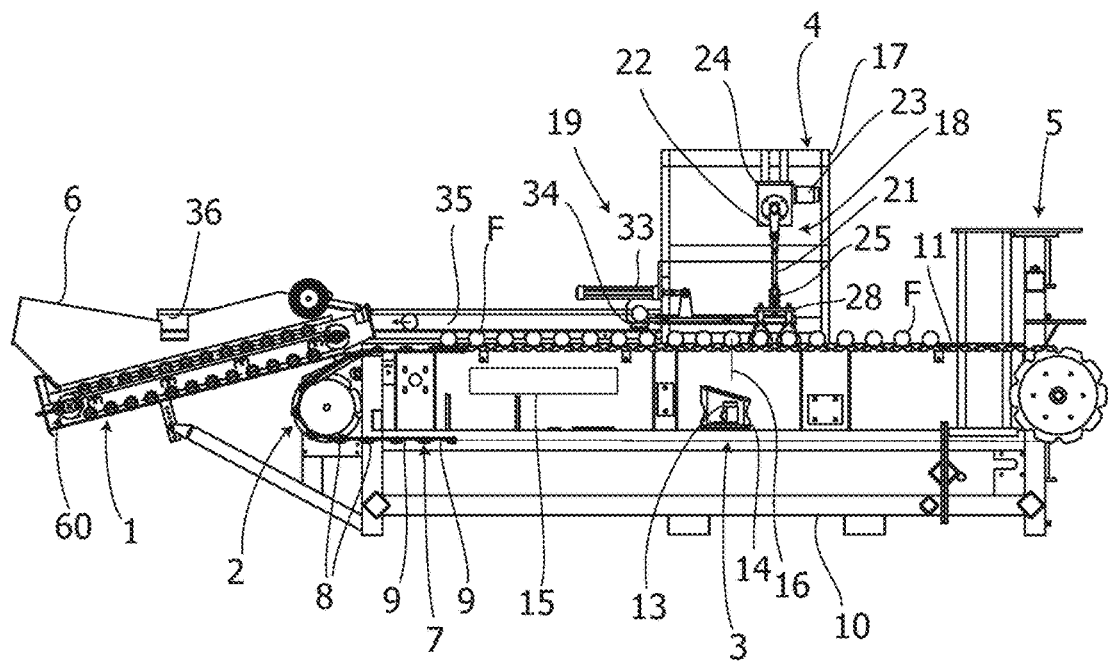
FIG. 1 is a fragmentary schematic side view of a first embodiment of an apparatus for processing correctly oriented fruits, in particular apples, including a station for recognizing the correct orientation of the fruits and a station for picking the incorrectly oriented fruits.

Reference is made to FIG. 1 that is a side view of an embodiment of an apparatus which embodies the method of recognizing the orientation of a fruit F, the method being intended for fruits, such as peaches and apples, having a central axis of symmetry. The central axis of symmetry passes through the concave parts of the fruit F, which are stalk cavity cp and calicin c that is more evident in the apples. The other parts of the fruit F are convex. A sample fruit taken as a comparison reference for the F fruits to be treated is indicated as Fo.

The method according to the invention provides that fruits F travel on a fruit multiple lanes tape, formed by mesh elements 8 and fruit holding flights 9, in a conveyor along a longitudinal frame 10. The fruit holding flights 9 are shaped with rows of recesses 11, and each recess 11 is provided with a central opening 12 showing the fruit F contained in the recess 11. The method comprises:

a stopping step of a sample fruit Fo in a position selected between a position above a measuring instrument and a position below the latter;

an initial measurement step in which the measuring instrument measures its distance from the sample fruit Fo when targeting a concave part of the sample fruit Fo, and the measuring instrument measures its distance from the same sample fruit Fo when targeting a convex part of the sample fruit Fo;

an individual measurement step of each fruit F to be treated travelling on the fruit multiple lanes tape 7, by means of the same measuring instrument positioned in the same manner as in the initial measurement step;

a step of comparing the distance measured in the individual measurement step of each fruit F to be treated with those measured in the initial measurement step of the sample fruit Fo, in order to assess whether the distance measured in the individual measurement step is that one of a concave part of the fruit F or is that one of a convex part of the fruit F; and a check step that determines that the fruit F is correctly oriented with its central axis of symmetry being in vertical position, if the distance measured in the individual measurement step is that one of a concave part of the fruit F, or that the fruit F is not correctly oriented if the distance measured in the individual measurement step is that one of a convex part of the fruit F.

As stated above, the method according to the present invention is embodied in the apparatus for the treatment of fruits shown in FIG. 1 which is a fragmentary schematic side view of a first embodiment thereof for the treatment of apples. The apparatus comprises a loading station 1 of fruits F, a fruit flight conveyor 2, a station 3 for recognizing the correct orientation of the fruits F, a station 4 for picking up not correctly oriented fruits F, a cutting station 5 shown only in part to indicate its location in the equipment.

The loading station 1 of fruits F has a hopper 6 for loading the fruits F to be treated and a conveyor 60 with biconical rollers. The fruit flight conveyor 2 has a fruit multiple lanes tape 7, formed by mesh elements 8 and fruit holding flights 9. The fruit multiple lanes tape 7 advances longitudinally in a longitudinal frame 10. The fruit holding flights 9 are shaped with rows of recesses 11. Each recess 11 has a central opening 12, better shown in FIGS. 2 to 7 which are enlarged fragmentary schematic side views of the station 3 for recognizing the correct orientation of the fruits F.

The station 3 for recognizing the correct orientation of the fruits F employs a row of distance meters 13, preferably laser gauges, each being located under the central opening 12 of each recess of the row of recesses 11. The distance meters 13, one for each fruit feed lane, are located inside a housing 14 transversal with respect to the feed lanes of fruits F. The upper surface of the housing 14 is inclined downwardly. The fruit holding flights 9 advance intermittently, so that each row of recesses 11 stops with the central openings 12 of the recesses 11 coaxial with the distance meters 13. If the distance meters 13 are laser gauges, each laser beam passing through the central opening 12 of the recess 11 which supports a fruit F, targets the stalk cavity cp or the calycin c of the fruit F. This occurs if the fruit F has previously been correctly oriented with its own axis of central symmetry in the vertical direction by means of a continuous orientation device, known from EP 2 731 893, indicated generally as 15 (FIG. 1), which is located upstream of the recognition station 3. It should be understood that, if the fruit is correctly oriented, such as those indicated by a checkmark ✓ in FIGS. 2 to 7, the measurement performed by the distance meter 13 provides a measure of distance greater than the distance of any other part of the fruit F different from the stalk cavity or the calycin. In fact, as it occurs to the fruit indicated with a cross mark X in FIGS. 2 to 7, the measurement performed by the distance meter 13 gives a distance smaller than the previous one; in fact, the beam 16, in the case of a laser gauge, targets a convex part of the fruit F instead of a concave part such as the stalk cavity cp or the calycin c. In this case the fruit F, indicated as X, must be discarded.

This is provided by the pickup station 4 of the fruits F that removes the discarded fruits from the fruit multiple lane tape. The pickup station 4 comprises a vertical frame 17 (FIG. 1), an articulated withdrawing mechanism 18, shown in detail in FIGS. 2 to 7, a device 19 for removing the not correctly oriented fruit F and a programmable logic controller (PLC), located inside the electrical panel that is not shown. The operation of the PLC will be explained later.

The vertical frame 17 is substantially a portal which transversely crosses the feed lanes of the fruits F. The vertical frame 17 supports the articulated withdrawing mechanism 18, having a gripper transverse plate 28 connected at each lateral end thereof, by means of a connecting rod 21 and a crank 22, to a brushless motor 23 through a gear 24 with orthogonal axes. Each connecting rod 21 has a connecting rod foot 25 connected to a slider 26 sliding in a vertically arranged linear guide 27. Connected to the slider 26 is the transverse gripper plate 28, to which at least one gripper 29, in the number of two in the illustrated embodiment, is fixed below each feed lane of the fruits F. According to the present embodiment, each gripper 29 has two gripping elements generically indicated as 30, for catching an incorrectly oriented fruit F. It should be clear that the gripping elements may be in a number different from two and of a different shape depending on the fruit to be processed.

The programmable logic controller (PLC) is adapted to receive information on the orientation of the central axis of symmetry of the fruit F by the recognition station 3, and to control the articulated withdrawing mechanism 18 for picking the incorrectly oriented fruits F.

The device 19 for removing the incorrectly oriented fruit F includes an ejection tray 31 overlying the fruit holding flights. The ejection tray 31 is slidable in a horizontal guide 32 by means of a cylinder 33 for moving the ejection tray fixed to the vertical frame 17.

A return path of the not correctly oriented fruits F includes a transverse recirculation belt 34 reachable from the ejection tray 31 and connected to a chute 35 (FIG. 1) leading to a recycle point 36 in the hopper 6 of the loading station 1, for reprocessing the fruits that are not perfectly oriented.

FIGS. 2 to 7 show in various steps the operation of the recognition station and of the pickup station of the apparatus according to the present invention.

Figure 2:
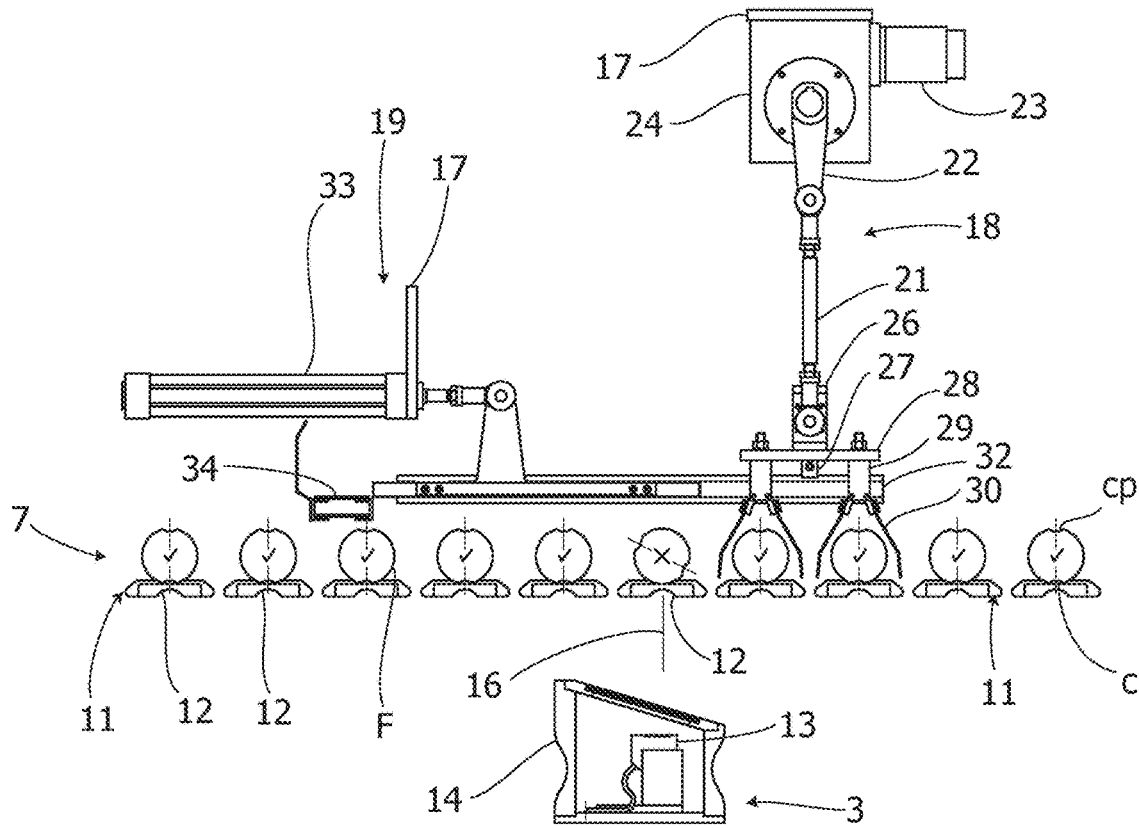
FIGS. 2 to 7 are enlarged partial schematic side views of the station for recognizing the correct orientation of the fruits and picking up the not correctly oriented fruits in FIG. 1, in successive steps.

In FIG. 2 the articulated withdrawing mechanism 18 is shown with its pincers 29 overlying two correctly oriented fruits, but with a subsequent fruit not correctly oriented.

Figure 3:
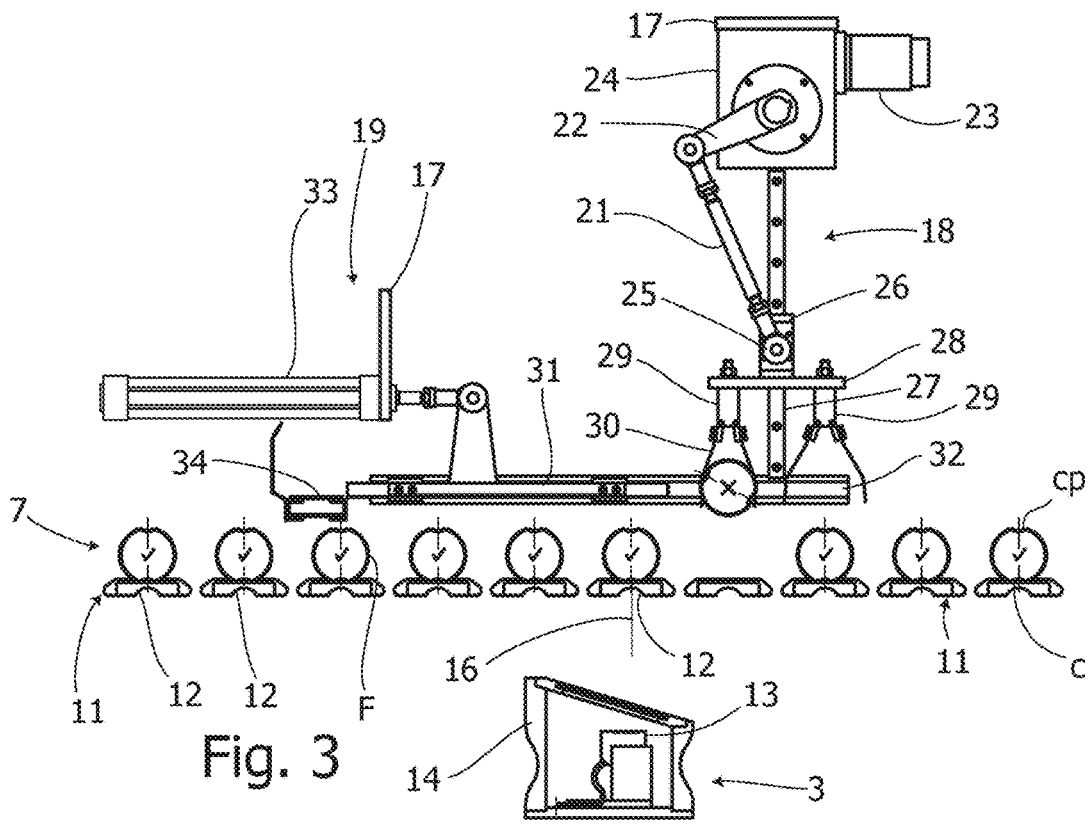

FIG. 3 shows the articulated withdrawing mechanism 18 in the quadrature position, in which, as notified by the PLC, the withdrawing mechanism 18 has closed the gripping element 30 of a gripper 29 on the fruit marked with the X, which is not correctly oriented, and is raising it, in order to remove it from the recess 11 of the fruit holding flight.

Figure 4:
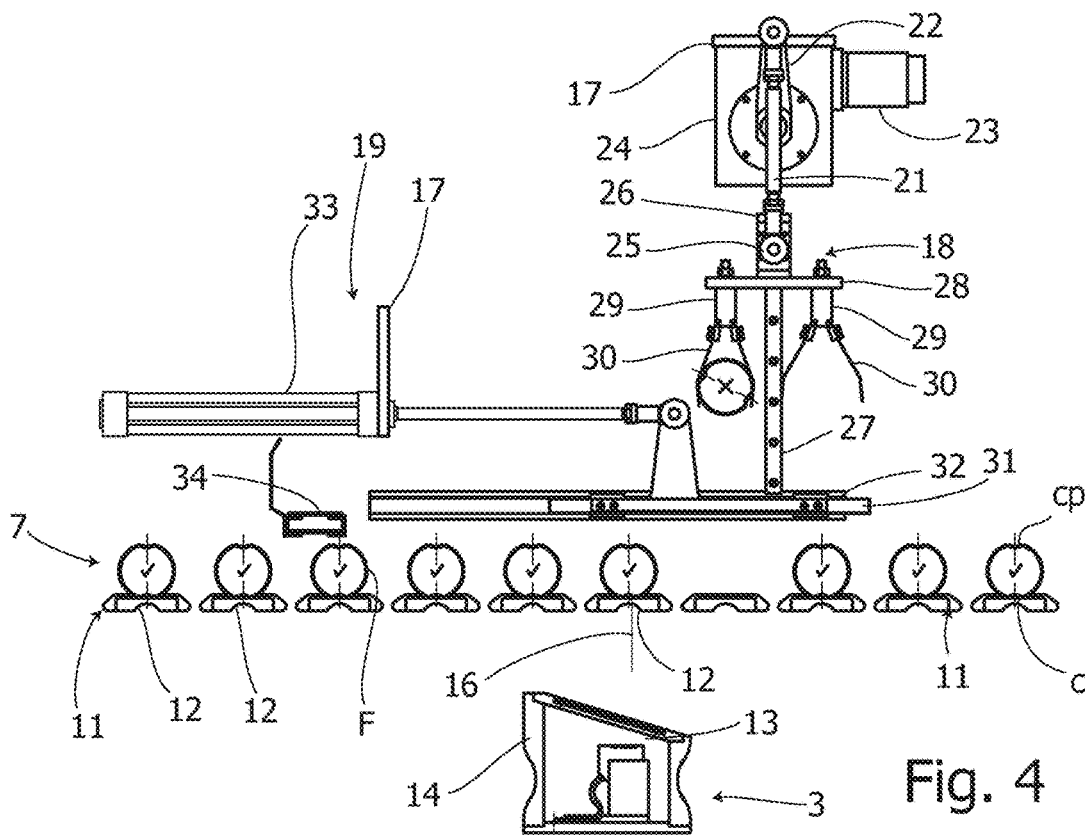

In FIG. 4, the articulated withdrawing mechanism 18 has completed the cycle: the crank 22 is in its upper dead point and, therefore, the gripper 29 with the fruit marked with the X is located above the ejection tray 31.

Figure 5:
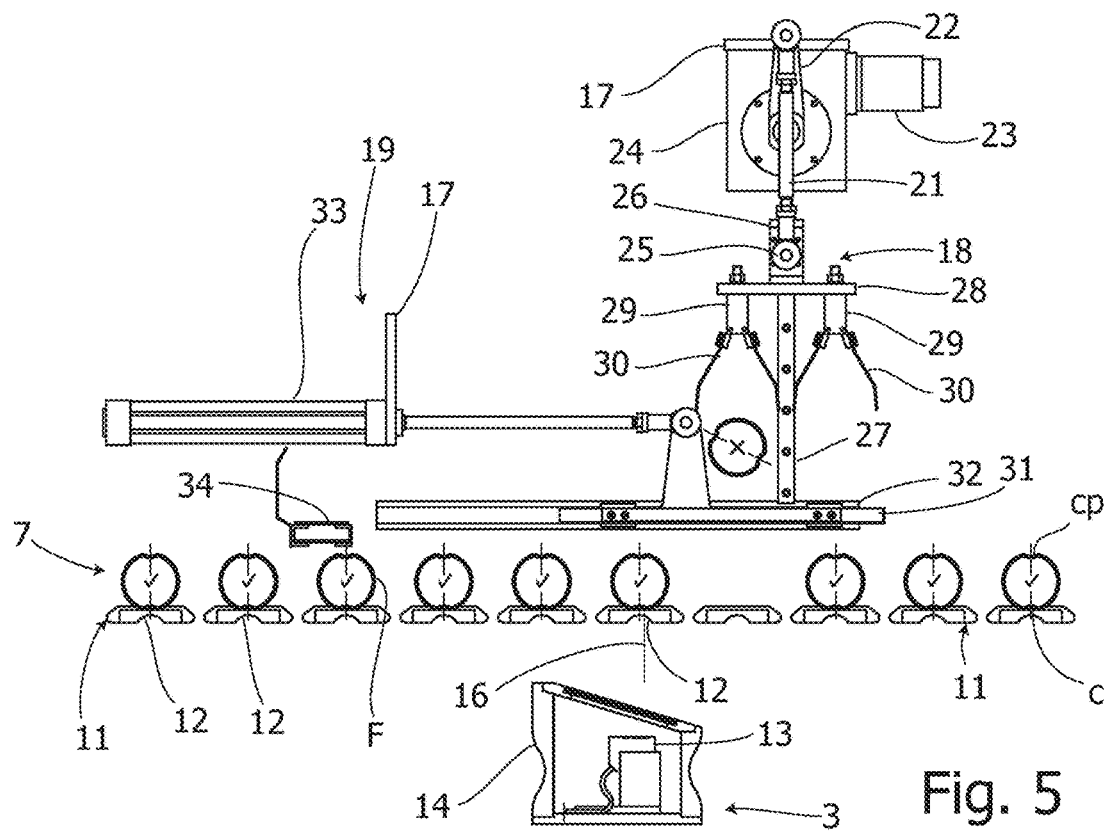

In FIG. 5, the gripper 29, upon command of the PLC, causes the fruit to fall onto the ejection tray 31.

Figure 6:
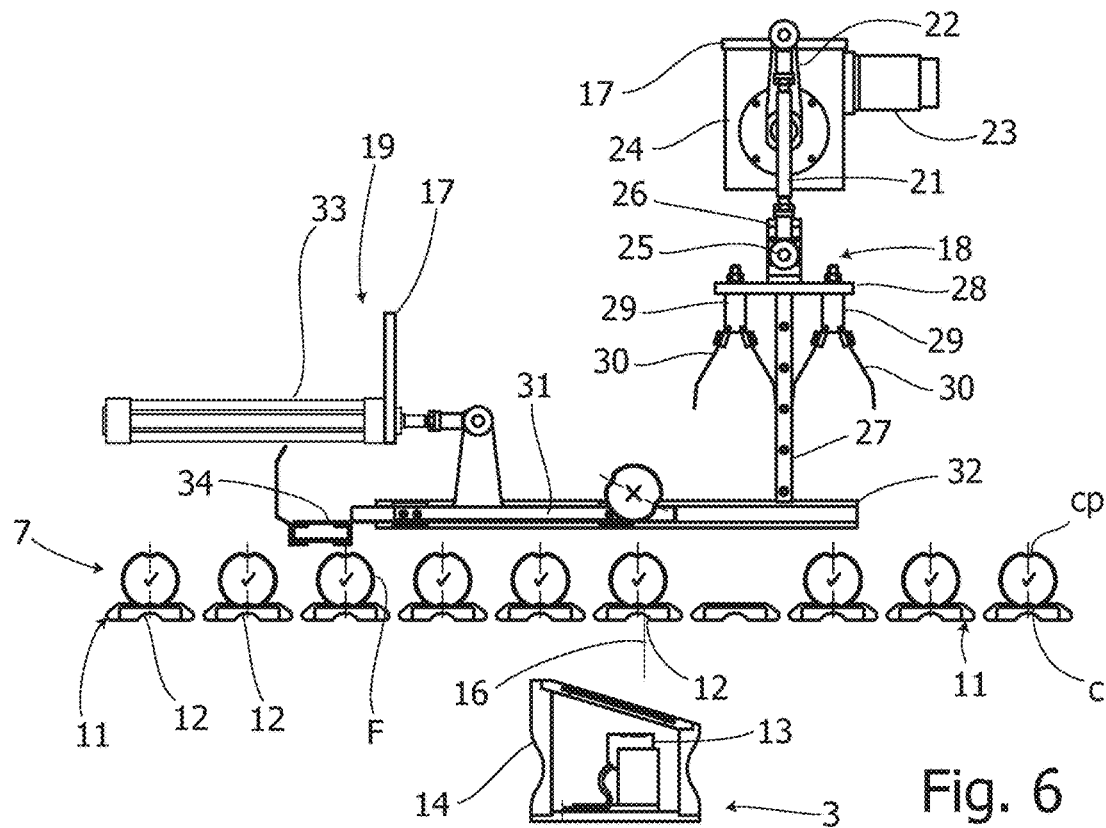
Figure 7:
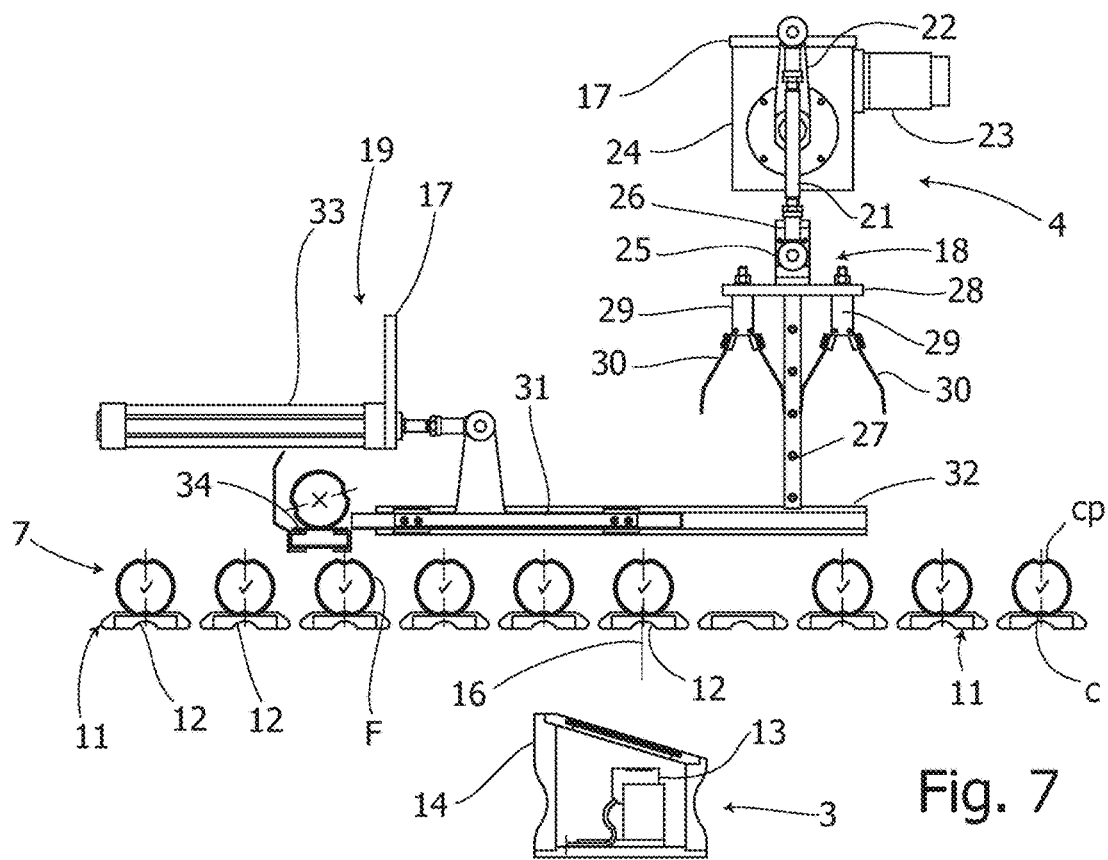

In FIG. 6 it is shown that, thanks to the cylinder 33 for moving the ejection tray, the fruit F with the X is moved towards the recirculation belt 34 to return to the hopper 6.

The first embodiment described above serves mainly for treating fruits positioned with their central axis of symmetry in a vertical position. This positioning is useful, for example, for coring apples, but also peaches, when their cutting according to the meridians is not required.

Figure 8:
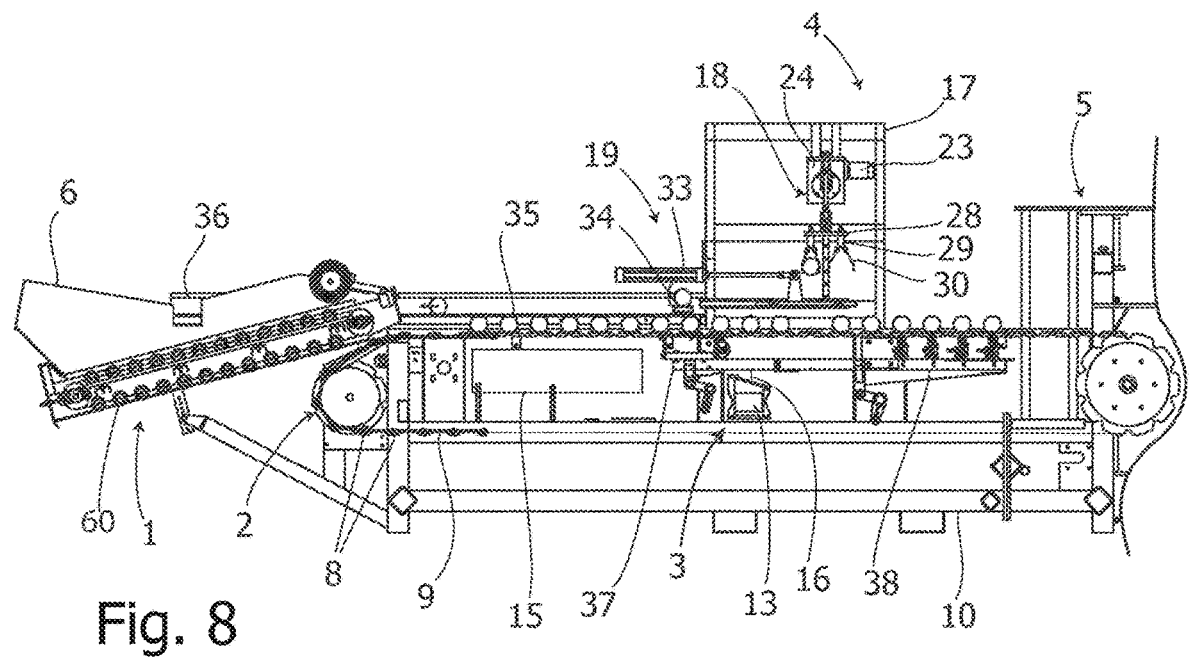
FIG. 8 is a fragmentary schematic side view of a second embodiment of an apparatus for processing correctly oriented fruits, in particular peaches, including a station for recognizing the correct orientation of the fruits.

Referring to FIG. 8, there is shown a fragmentary schematic side view of a second embodiment of an apparatus for processing correctly oriented fruits, in particular peaches. Parts identical to those of FIG. 1 are marked with the same reference numbers.

This second embodiment includes, upstream of the station 3 for recognizing the correct orientation of the fruit F, a fruit transversal orientation device 37 and, downstream of the picking station 4 of the not correctly oriented fruits F, a fruit orientation alignment device 38. The fruit transverse orientation device 37 and the fruit alignment orientation device 38 are of known type and are not described in detail. They serve, in particular, to position the peaches with their suture plane coplanar to the cutting knife.

Figure 9:
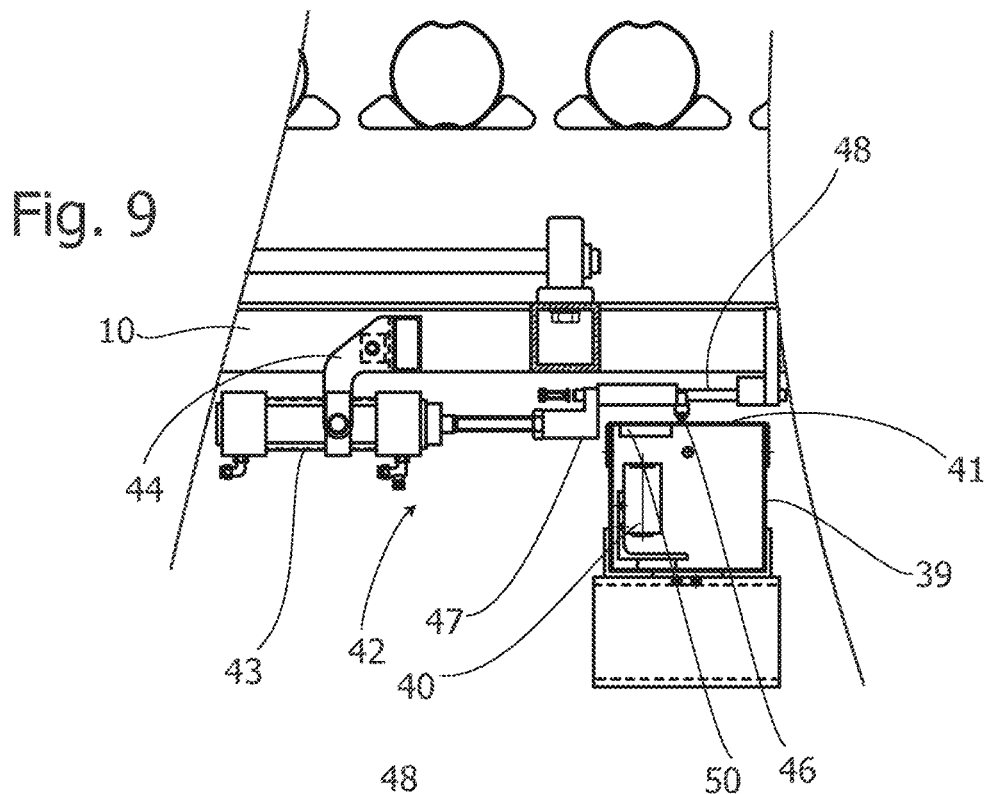
FIGS. 9 and 10 are a fragmentary side view and a partially cross-sectioned top plan view, respectively, of a variant of the second embodiment of a correctly oriented fruit processing apparatus, shown in FIG. 8.
Figure 10:
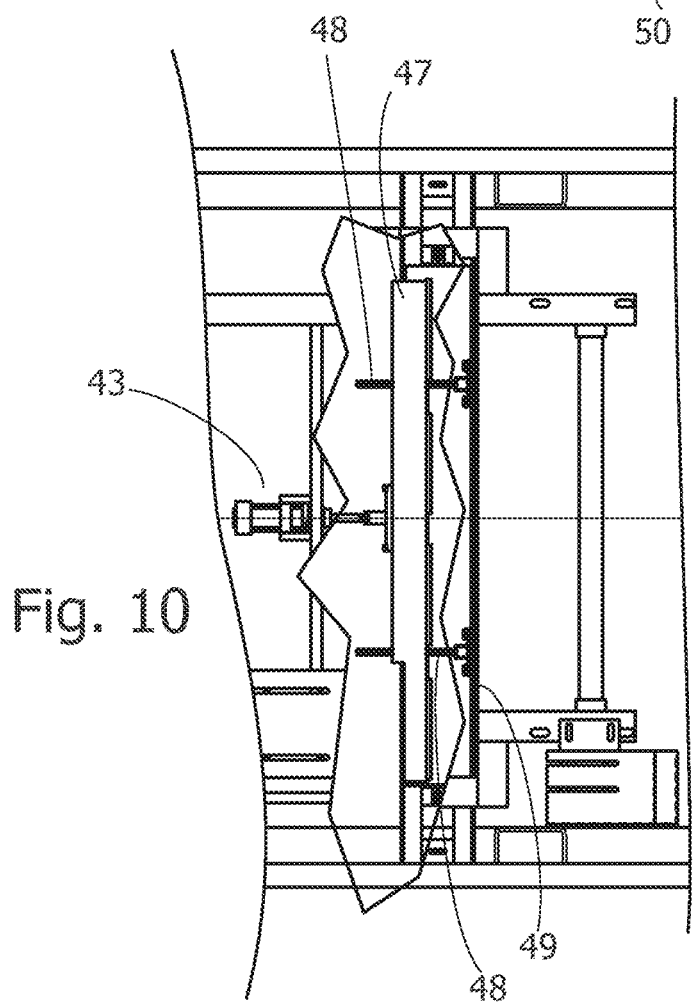

Refer now to FIGS. 9 and 10, which are a fragmentary side view and a top plan view, respectively, of a variant of the second embodiment shown in FIG. 8, with particular reference to the station 3 for recognizing the correct orientation of the fruits F. Parts similar to those of FIG. 8 are marked with the same reference numbers. Indicated as 39 is a housing for the distance meters 40, similar to the housing 14, illustrated schematically in FIGS. 1 to 8. Differently from the housing 14 that has a sloping roof, the housing 39 has a flat cover 41 so as to be maintained cleaned by means of a cleaning device indicated generally as 42. The cleaning device 42 comprises a pneumatic cylinder 43, fixed by means of a bracket 44 to the longitudinal frame 10 of the machine. The pneumatic cylinder 43 has a stem 45 which supports in its free end a plurality of brushes 46, preferably made of rubber, superiorly in contact with the surface of the flat covering 41 of the housing 39. As shown in FIG. 10, the brushes 46 are preferably mounted below a single transversal brush holder arm 47 operated by the pneumatic cylinder 43 slidingly on a pair of guide rods 48 hanging from a crosspiece 49 fixed on the same longitudinal frame 10. The reciprocating movement of the rod 45 of the pneumatic cylinder 43 allows the brushes 46 to clean the flat cover 41 from water, steam, remains of fruit or anything else deriving from the processing of the fruits, which should be deposited on the glass during processing. Although very small, the area of the laser spot is extremely sensitive and the possible presence of foreign bodies, albeit small, could deviate the path of the laser itself or obstruct its passage causing an incorrect reading and, consequently, the malfunction of the whole recognition system of the apparatus according to the present invention.

In fact, one of the problems that can occur with the laser device employed in the apparatus for processing fruits according to the present invention is the possible refraction of the laser light when the flat cover 41 crossed perpendicularly from the light for reading operations becomes dirty. The cleaning device 42 provides a solution to this problem by means of the brushes 46 operated by the pneumatic cylinder 43 located above the recognition station 3 above the flat cover 41 of the housing of the distance meters containing the laser gauges 40. Below the flat cover 41, the housing 39, preferably constructed of watertight steel, carries the eight laser gauges 40. Above the flat cover 41 the brush carrying transverse arm 47 constitutes a movable element for obscuring the cover 41 in correspondence with a transparent sheet 50 thereof, preferably of plexiglass, which allows the passage of the laser beams of the distance meters. In particular, during the intermittent advancement motion of the fruit holding flights, above the flat cover 41, in correspondence with its transparent plate 50, the brush carrying transverse arm 47 leaves the transparent plate 50 free for the passage of the laser light only when the apparatus stops, this coinciding with the reading time to be performed with lasers on the stalk cavities or calycins of the fruits. Once the reading has been carried out, the cover 41 is again overlain by the brush carrying transverse arm 47 which keeps the transparent sheet 50 clean.

Moving along the cover 41, the brushes 46 remove any residues deposited on the reading area of the laser meters 40 by moving them out of the cover 41.

It should be understood that the foregoing description represents only a few embodiments of the apparatus for processing fruits according to the invention which is defined by the appended claims.

The invention claimed is:

1. A method for recognizing the orientation of a fruit having a central axis of symmetry passing through fruit concave parts, which are a stalk cavity and a calycin of the fruit, and other parts of the fruit being convex, the fruit travelling on a fruit multiple lanes tape, formed by mesh elements and fruit holding flights having a number of recesses, each of the recesses comprising a central opening showing the fruit contained in the recess, the method comprising:
   a stopping step of a sample fruit in a position selected between a position above a measuring instrument and a position below the measuring instrument;
   an initial measurement step in which the measuring instrument measures a distance from the sample fruit when targeting a concave part of the sample fruit, and the measuring instrument measures a distance from the same sample fruit when targeting a convex part of the sample fruit;

an individual measurement step of each fruit to be treated travelling on the fruit multiple lanes tape by the same measuring instrument positioned in the same manner as in the initial measurement step;

a comparison step in which the distance measured in the individual measurement step of each fruit to be treated is compared with the distances measured in the initial measurement step of the sample fruit, to assess whether the distance measured in the individual measurement step is that one of a concave part of the fruit or that one of a convex part of the fruit; and a check step that determines that the fruit is correctly oriented with the central axis of symmetry being in vertical position, if the distance measured in the individual measurement step is that one of a concave part of the fruit, or that the fruit is not correctly oriented if the distance measured in the individual measurement step is that one of a convex part of the fruit.

2. An apparatus for performing the method of claim 1, comprising:

a loading station for fruits, a fruit flight conveyor in which a fruit multiple lanes tape, formed by mesh elements and fruit holding flights, advances longitudinally in a longitudinal frame, a station for recognizing a correct orientation of the fruits, a picking station of incorrectly oriented fruits to be removed from the fruit flight conveyor, and a cutting station, the fruit holding flights having a number of recesses, each of the recesses being provided with a central opening showing the fruit contained in the recess, wherein the station for recognizing a correct orientation of the fruits employs a row of distance meters, each of the distance meters being located under the central opening of the recess, in order to target the stalk cavity or the calycin of the fruit through the central opening of the recess to measure a distance of the fruit, and to recognize a distance greater than the distance of any part of the fruit different from the stalk cavity or the calycin, or equal to the distance of any part of the fruit different from the stalk cavity or the calycin, so that the station assesses whether or not an orientation of the central axis of symmetry of the fruit is vertical.

3. The apparatus according to claim 2, wherein the distance meters are laser gauges having a beam that passes through the central opening of the recess of the fruit holding flights, the distance meters being contained in a transversal housing underlying the longitudinal frame.

4. The apparatus according to claim 2, wherein the picking station of the fruits comprises:

a vertical frame, supporting
an articulated withdrawing mechanism having a gripper transverse plate connected to each lateral end by a connecting rod and a crank to a brushless motor through a gear with orthogonal axes, each of the connecting rod having a connecting rod foot connected to a slider sliding into a vertically arranged linear guide, and carrying the gripper transverse plate with at least one gripper having gripping elements for catching an incorrectly oriented fruit, a device for removing the incorrectly oriented fruit, including an ejection tray above the fruit holding flights, a cylinder for moving the ejection tray and an incorrectly oriented fruit return path to the loading station, and a programmable logic controller configured and operable to receive information on the orientation of the central axis of the symmetry of the fruit, and controlling said articulated withdrawing mechanism for picking the incorrectly oriented fruits.

5. The apparatus according to claim 2, wherein situated upstream of the station for recognizing the correct orientation of the fruits is a fruit orientation device configured to arrange each fruit with the central axis of symmetry of each fruit in a vertical position.

6. The apparatus according to claim 2, wherein situated upstream of the station for recognizing the correct orientation of the fruits is a fruit transversal orientation device, and situated downstream of the incorrectly oriented fruit picking station is a fruit alignment orientation device.

7. The apparatus according to claim 3, wherein the housing of the distance meters has a flat cover, and a cleaning device comprises a pneumatic cylinder secured by a bracket to the longitudinal frame of the apparatus, the pneumatic cylinder having a stem supporting at a free end a plurality of brushes, superiorly in contact with the surface of the flat cover of the housing.

8. The apparatus according to claim 7, wherein the brushes are mounted inferiorly to a brush carrying transverse arm actuated by the pneumatic cylinder, the brush carrying transverse arm being slidable on a pair of guide rods hung to a crosspiece fastened to the longitudinal frame.

9. The apparatus according to claim 8, wherein the brush carrying transverse arm stands above the flat cover provided with a transparent sheet for dimming the flat cover used for passage of the laser beams of the distance meters.

* * * * *